Feb. 20, 1940.　　F. C. MILLER ET AL　　2,191,028
FILM PACKAGE
Filed May 5, 1937
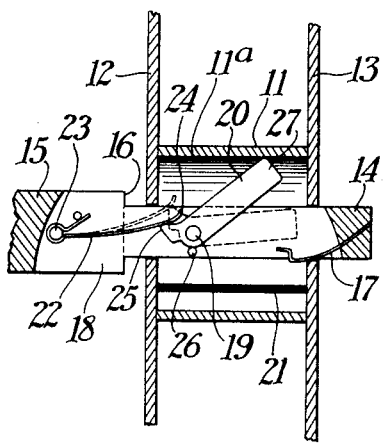
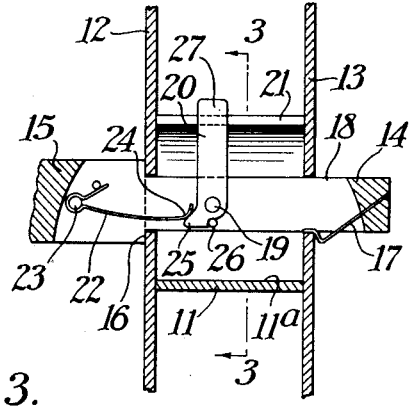
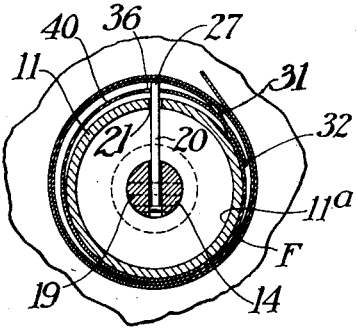
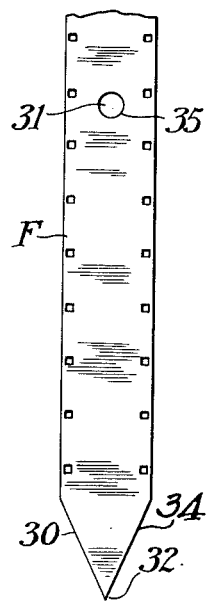
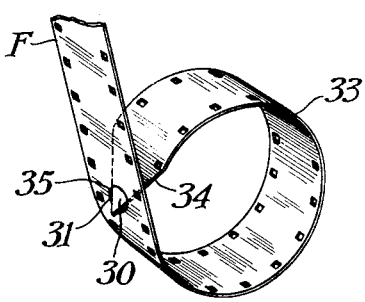
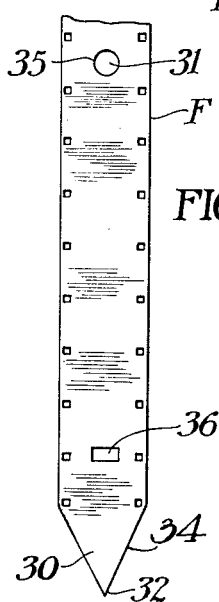
Frank C. Miller
Otto Wittel
Donald F. Lyman
INVENTORS
BY
ATTORNEYS Patented Feb. 20, 1940

2,191,028

UNITED STATES PATENT OFFICE 2,191,028

FILM PACKAGE

Frank C. Miller, Chicago, Ill., and Otto Wittel and Donald F. Lyman, Rochester, N. Y., assignors to Eastman Kodak Company, Rochester, N. Y., a corporation of New Jersey Application May 5, 1937, Serial No. 140,876

4 Claims. (Cl. 206—59)

The present invention relates to coils of light-sensitive motion picture film, such as are supplied to the trade, and to apparatus for preparing such films.

One object of our invention is to provide a film wound on a film spool, having the innermost convolutions of greater diameter than the diameter of the core on which it is wound. Another object of our invention is to provide a means incorporated in the film itself, for maintaining the innermost convolution of the film at a minimum diameter greater than the diameter of the core on which it is wound. Another object of our invention is to provide a winding apparatus for preparing coiled films of the type referred to above. Another object of our invention is to provide a film winding device which is capable of winding film, having an innermost convolution of larger diameter than the diameter of the core on which the film is wound. Still another object of our invention is to provide cooperating interengaging portions on the innermost end of the film strip which may cooperate to limit the size of the innermost convolution of film, and which may be readily disengaged as the film is removed from its support, and other objects will appear from the following specification, the novel features being particularly pointed out in the claims at the end thereof.

It has been found that when motion picture film is tightly wound against a hub having a slot or some other fastening means for the end of the film, and when convolutions of film are tightly wound one over the other, that it frequently happens that the film is physically embossed, irregular areas in the film appearing sometimes for quite a large number of convolutions, and in each instance these embossings occur over the irregularity in the film spool hub. This does not occur where the winding is loose, but it nevertheless may, and frequently does, occur where the film is wound upon a spool at a normal light tension when the film is "green" or fresh. When such a film is stored for some months, the film may shrink and thus bind tightly on the hub. This shrinkage sometimes tightens the film to such an extent that portions of the film are permanently embossed, so that when the film is unwound, portions of the film will bend away from the normal plane of the film. Such embossing may or may not be eliminated in processing the film.

With certain types of film, the light-sensitive photographic emulsions are also susceptible to damage through pressure. Thus, drawing a film tightly around an irregular surface may, in addition to leaving the usual embossings, leave an area of different sensitivity from the sensitivity of the normal film, so that this area may show up when the film is developed. While this second difficulty does not occur as frequently as the first, it is nevertheless desirable to overcome it, if possible.

In accordance with the present invention, we provide a film, the end of which is provided with suitable cooperating portions, such as a point on the extreme end of the film adapted to cooperate with edges, such as the edges of an aperture cut at a point in the film spaced from the end so that when these parts cooperate, they will limit the minimum diameter of the innermost convolution of film. We prefer to wind such a film on a special type of winding apparatus which will facilitate providing an inner convolution of larger size than the hub on which the film is wound and to utilize this device for winding only, since it is desirable to have the film go to the customer on a reel of the standard type. In accordance with our invention, the innermost convolution of film on the reel will be of materially larger diameter than the diameter of the hub so that even if shrinkage in the film should occur, the film could not be drawn tightly against the hub, and thus be embossed and possibly also desensitized.

The effect which occurs due to embossing is, that as the end of a film which has been embossed passes through a motion picture camera, the embossings will sometimes definitely prevent the gate of a motion picture camera from holding the film in the focal plane of the objective, so that there will be small areas at intervals corresponding to the diameter of the hub, in which one or more film frames will be out of focus. If the film is of a type in which pressure effects the sensitivity of the emulsion, when the film is developed it will appear as if certain frames were not developed evenly with respect to the major portion of the film.

It is for overcoming these difficulties that the present invention has been made.

In the drawing:

Fig. 1 is a sectional view taken through a film reel and the spindle therefor, showing the manner of assembling the reel on a spindle constructed in accordance with one embodiment of the present invention.

Fig. 2 is a view similar to Fig. 1, but with the reel in operating position, and illustrating one embodiment of the invention for spacing the inner film convolution from the reel core.

Fig. 3 is a vertical sectional view taken substantially on line 3—3 of Fig. 2, showing the film arranged on the core in a manner partially illustrated in Fig. 4.

Fig. 4 is a perspective view of a film reel, with the flanges omitted for the sake of clearness, showing a modification by which the film is secured to the core and the inner film convolution is spaced therefrom.

Fig. 5 is a section of the film strip used in the arrangement shown in Fig. 4.

Fig. 6 shows an arrangement whereby a film convolution of definite diameter may be formed and maintained.

Fig. 7 is a section of the film strip used in the arrangement shown in Fig. 6.

The same reference numerals throughout the various views indicate the same parts.

In its broadest aspect, the invention relates to a winding device on which a strip of sheet material may be wound. The invention is, however, embodied in the present instance, by way of illustration, in a winding device or reel on which motion picture film may be wound into a roll of suitable size. In order to prevent embossing of the film by irregularities in the core surface, the innermost film convolution is formed of a diameter slightly greater than the core so as to provide a slight clearance between the core and the inner convolution, as hereinafter more fully described.

Referring now to the drawing, Fig. 1 shows a motion picture reel, of the usual or any suitable construction, formed to provide a central hub or core 11 on which the film strip F is wound, and spaced side flanges 12 and 13 which maintain the successive film convolutions in alignment. The reel is slidably mounted on a reduced portion 14 of the reel spindle 15, and is arranged to abut a shoulder 16 formed on the spindle 15. The reel may be held in position on the spindle by any suitable means as, for example, by a small leaf spring 17 which is secured to the spindle 15 and engages the outer flange 13, as shown in Fig. 2.

The spindle 15 is, in the present embodiment, formed with a longitudinal slot 18, arranged in the manner clearly illustrated in Figs. 1 and 2. A pin 19 extends across the slot 18, and has pivotally mounted thereon a hinge arm 20 which is arranged to extend radially from the spindle and to project through a slot or opening 21 formed in the reel core 11, as illustrated in Fig. 2. The arm 20 is pivoted about the pin 19 by reason of a leaf spring 22 one end of which is secured to a pin 23 in slot 18, while the free end 24 thereof engages a toe 25 formed on the lower end of the arm 20. Movement of the arm 20 about the pin 19 is limited by a stop pin 26 which extends across the slot 18, as shown in Figs. 1 and 2.

When the reel is placed on the spindle, the hinged arm 20 is swung down, against the action of the spring 22, and is held in the slot 18, as shown in dotted lines in Fig. 1. The reel is then slid into place in the normal manner. As soon as the flange 12 loses contact with the arm 20, the latter swings up, by reason of the spring 22, until it engages the inner surface 11a of the core 11, as shown in full lines, Fig. 1. The reel is then turned on the spindle until the slot or opening 21 in the core 11 registers with the arm 20, at which time the arm snaps through the opening 21 and into the position shown in Fig. 2 so that the upper end 27 of the arm projects above the surface of the core 11. In this position, the arm 20 provides a key which will prevent rotation of the reel relative to the spindle.

It is apparent that when a film strip is now wound on the reel, the upper end 27 on the arm 20 will engage the first film convolution and will thus cause a portion of this convolution to be spaced from the core 11 so that the convolution will have a greater diameter than the core. This larger diameter will thus afford a material clearance between the core 11 and the first film convolution. It has been found, however, that when the reel is detached from the spindle and is excessively jarred, as may occur in shipping or when the outer end of the film strip is pulled, this clearance may, in some cases, be eliminated and the film may snub around or press into the core so as to be embossed thereby.

In order to eliminate any possibility of the core 11 embossing the inner film convolution, the present invention provides a new and novel arrangement whereby the minimum diameter of the inner film convolution is limited so that the film cannot snub around the core 11. To secure this desired result the inner end of the film strip is tapered to form a tongue 30 which is arranged to project through an aperture 31 formed in the film strip. The aperture 31 is preferably spaced a distance from the tongue 30 so that when the end 32 of the tongue projects through the aperture 31, as shown in Fig. 6, a coil or convolution 33 is formed, the diameter of which is slightly larger than that of the core 11, thus providing the desired clearance around the core. Furthermore, the edges 34 of the tongue 30 frictionally engage the edges 35 of the aperture 31 to limit the minimum diameter of the coil 33 so that the film would not snub around or press into the core 11, as will be apparent upon inspection of Fig. 6 of the drawing.

The main advantage of this construction is that it maintains a clearance between the coil 33 and the core 11 without the necessity of a cemented or taped fastening which would cause a film jam in the camera at the end of the run. Furthermore, taped joints are not feasible because small patches of the tape would be likely to lodge in the camera mechanism, as is apparent to those familiar with the art. In addition, such a construction is adapted to be used not only with the spindle arrangement shown in Figs. 1 and 2, but also with the usual type of winding reels now on the market.

Referring now to Figs. 3, 4, and 5 wherein is shown a modification of the above arrangement which is adapted for use with the hinged arm construction illustrated in Figs. 1 and 2. The film strip F shown in Figs. 3, 4, and 5 is similar to that illustrated in Figs. 6 and 7, and corresponding parts are designated by the same numerals. The modifications embodied in Figs. 3, 4, and 5 show a small slot or hole 36 adjacent the tapered tongue 30. This arrangement provides, in effect, a convenient means for fastening the film strip onto the reel arrangement illustrated in Figs. 1 and 2.

From an inspection of Figs. 3 and 4, it is seen that the film strip may be easily hooked over the arm 20 by slipping the latter through the slot 36. The strip may then be wrapped around the core 11 to bring the aperture 31 into position to receive the tongue 30, as clearly illustrated in Fig. 4, the latter then being inserted in the opening 31, as above described. This design facilitates winding by providing the operator with a means for fastening or securing the film strip to the core. Insertion of the tongue 30 into the aperture 31 can be facilitated by bending the tongue 30 backward. Such a bend could be stamped into the film by the same tool that perforates the holes 31 and 36 and cuts the tongue 30.

When the reel is removed from the spindle, the arm 20 is, of course, retracted and the arrangement is then substantially the same as that illustrated in Fig. 6, in which the diameter of the coil is maintained by virtue of the inner engagement of the edges 34 of the tongue 30 and the sides 35 of the aperture 31.

By means of such an arrangement the strip may be readily and easily fastened to the core, and an inner film convolution of proper diameter may be simultaneously formed. It is apparent, however, that the slot and arm arrangement shown in Fig. 4, may be used without the tongue and aperture arrangement shown in Figs. 6 and 7. In which case, the strip may be laid over the core so that the tongue 30 projects through the slot 36, in the manner shown in Fig. 4. The strip may then be wrapped around the core and the arm 20, as shown at 40, Fig. 3, to form an inner film convolution of proper diameter to provide the desired clearance between the core and the film strip.

It is thus apparent from the above description that the present invention provides a new and improved film reel or package as well as a new film winding device which effectively prevents the core from embossing the film strip. Such an arrangement is also simple in construction, easy to manipulate, and adapted to be used with a wide variety of film reels.

While certain embodiments of the invention have been disclosed, it is to be understood that the inventive idea can be carried out in a number of ways. This application is, therefore, not to be limited to the precise details described, but is intended to cover all variations and modifications thereof falling within the spirit of the invention and the scope of the appended claims.

What we claim is:

1. A film package comprising a spool having flanges spaced on a hub, a strip of film wound thereon in a plurality of convolutions, said film terminating in a tapered tongue, said film having an aperture therein so spaced that the tongue by extending into the aperture may determine the minimum diameter of the innermost film convolution, said tongue and aperture being spaced so that the minimum diameter of the film convolution will be larger than that of said hub.

2. A film package comprising a spool having a hub, a strip of film wound on said hub in a plurality of convolutions to form a roll, a pair of tapered edges formed on the strip adjacent one end thereof, and curved edges formed on said strip and so spaced from said tapered edges that by engaging the latter an innermost convolution of the roll is formed of a greater diameter than said core, said engaging edges serving to also maintain the diameter of said innermost convolution.

3. A film package comprising a spool having a hub, a strip of film wound on said hub in a plurality of convolutions to form a roll, and a pair of cooperating portions spaced longitudinally of said strip and adapted to be brought into interengaging relation to form an innermost convolution of said roll of a greater diameter than said core and to also maintain said diameter.

4. A film package comprising a spool having a hub, a strip of film wound on said hub in a plurality of convolutions to form a roll, a pair of edge portions on said strip adjacent to the end thereof, and a second pair of edge portions on said strip so spaced longitudinally along said strip from said first portions that when brought into interengaging relation therewith will not only form an innermost convolution of greater diameter than said core but will also effectively maintain said diameter.

FRANK C. MILLER.
OTTO WITTEL.
DONALD F. LYMAN.